United States Patent
Rottiers et al.

(10) Patent No.: US 10,523,819 B2
(45) Date of Patent: Dec. 31, 2019

(54) CENTRAL UNIT FOR A CONFERENCING SYSTEM

(71) Applicant: TELEVIC CONFERENCE NV, Izegem (BE)

(72) Inventors: Luc Rottiers, Wetteren (BE); Klaas Maerten, Poperinge (BE); Didier Rosez, Dadizele (BE); Cedric Mélange, Roeselare (BE)

(73) Assignee: TELEVIC CONFERENCE NV, Izegem (BE)

( * ) Notice: Subject to any disclaimer, the term of this patent is extended or adjusted under 35 U.S.C. 154(b) by 125 days.

(21) Appl. No.: 15/539,427

(22) PCT Filed: Dec. 23, 2015

(86) PCT No.: PCT/EP2015/081116
§ 371 (c)(1),
(2) Date: Jun. 23, 2017

(87) PCT Pub. No.: WO2016/102642
PCT Pub. Date: Jun. 30, 2016

(65) Prior Publication Data
US 2018/0027122 A1 Jan. 25, 2018

(30) Foreign Application Priority Data

Dec. 23, 2014 (BE) .................................. 2014/5158

(51) Int. Cl.
*H04M 3/56* (2006.01)

(52) U.S. Cl.
CPC ........... *H04M 3/563* (2013.01); *H04M 3/566* (2013.01); *H04M 3/568* (2013.01);
(Continued)

(58) Field of Classification Search
CPC ............ H04M 3/568; H04M 2242/12; H04M 2250/58; H04M 2250/62; H04M 3/563;
(Continued)

(56) References Cited

U.S. PATENT DOCUMENTS 4,882,681 A * 11/1989 Brotz .................... G06F 17/289
704/3
8,451,313 B2 * 5/2013 Ujii ................... H04M 1/72522
348/14.08
(Continued)

FOREIGN PATENT DOCUMENTS

EP 0433049 A2 6/1991

OTHER PUBLICATIONS

Belgium Search Report for corresponding Belgium Application No. 2014/05158, dated Sep. 10, 2015.
(Continued)

*Primary Examiner* — Lisa Hashem
(74) *Attorney, Agent, or Firm* — Workman Nydegger

(57) ABSTRACT

A central unit for a digital conferencing system comprises a processing unit arranged for receiving a plurality of first control signals from a plurality of interpreter desks and indicating which interpreter channel is selected on an interpreter desk, and for identifying, based on the first control signals, which interpreter is interpreting in which interpreter channel and arranged for returning to and displaying on the plurality of interpreter desks a plurality of feedback signals. The central unit is arranged for receiving a plurality of second control signals from a plurality of listening units, and indicating which audio channel on a listening unit of the plurality of listening units is selected, for deriving, based on the plurality of second control signals, a total of listeners per listening channel and for sending to and displaying on the
(Continued)

plurality of interpreter desks, information on the total of listeners per listening channel.

10 Claims, 2 Drawing Sheets

(52) U.S. Cl.
CPC .. *H04M 2201/38* (2013.01); *H04M 2203/252* (2013.01); *H04M 2203/253* (2013.01); *H04M 2242/12* (2013.01)

(58) Field of Classification Search
CPC ........... H04M 3/566; H04M 2203/252; H04M 2201/38; H04M 2203/253
See application file for complete search history.

(56) References Cited

U.S. PATENT DOCUMENTS

| | | | | |
|---|---|---|---|---|
| 8,520,833 | B1* | 8/2013 | Pettay | H04M 3/56 379/265.01 |
| 9,253,329 | B1* | 2/2016 | Pettay | H04M 3/5233 |
| 2002/0161579 | A1* | 10/2002 | Saindon | G06F 17/28 704/235 |
| 2009/0089042 | A1* | 4/2009 | Wald | G06F 17/289 704/2 |
| 2013/0110565 | A1* | 5/2013 | Means, Jr. | G06Q 10/06 705/7.11 |
| 2013/0129058 | A1* | 5/2013 | Kelly | H04M 1/64 379/88.01 |
| 2013/0226557 | A1* | 8/2013 | Uszkoreit | G06F 17/289 704/3 |
| 2014/0132701 | A1* | 5/2014 | Wang | G06F 17/289 348/14.08 |
| 2014/0156254 | A1* | 6/2014 | Frankel | H04M 3/568 704/2 |
| 2015/0110259 | A1* | 4/2015 | Kaye | H04W 4/80 379/202.01 |
| 2016/0117628 | A1* | 4/2016 | Brophy | G06F 17/2854 704/2 |
| 2016/0170970 | A1* | 6/2016 | Lindblom | G06F 17/28 704/3 |
| 2016/0321245 | A1* | 11/2016 | Chisholm | G06F 17/289 |
| 2017/0322819 | A1* | 11/2017 | Melange | H04M 3/563 |

OTHER PUBLICATIONS

International Search Report for corresponding International PCT Application No. PCT/EP2015/081116, dated Apr. 11, 2016.

* cited by examiner

CENTRAL UNIT FOR A CONFERENCING SYSTEM

FIELD OF THE INVENTION

The present invention is generally related to the field of equipment for use in digital conferencing systems.

BACKGROUND OF THE INVENTION

A conferencing system comprises a central unit, connected with several delegate units for the participating delegates. The central unit serves to combine audio channels of various delegate units and to distribute the received audio and data channel and combinations of these channels.

A team of interpreters provides translation for the conference participants. This will typically take the form of simultaneous interpretation. Interpreters will usually have a so-called 'interpreter desk' to assist them in performing their work. This unit provides an interface that allows the interpreters to select the incoming language of their choice as well as the language into which they will be interpreting. The language out of which the interpreter interprets, is referred to as the 'relay language'. For this purpose, the interpreter desk comprises a number of relay buttons, often equipped with an LED indicator. These buttons can be easily programmed when going through the list of available languages. The interpreter desk contains a display, for example an LCD display, on which relevant information can be shown, for example, the quality of the relay languages (i.e. the number of subsequent translations), output channels or other additional information.

A special input channel is the floor channel of the conferencing system, i.e., the language that is being spoken on the conference floor at that moment. If this is a language that the interpreter does not master, the interpreter is unable to directly use the floor channel signal. The interpreter then has to rely on a translation of the language of the floor channel. In addition to, for example, an indication of the incoming languages, a relevant piece of information for the interpreter may consist of an indication of the quality of the translation. This will usually be done using a qualifier, such as, +, ++, +++ or FL, −1, −2; where 'FL' stands for 'floor language', i.e., the language that is being spoken on the conference floor at that moment. In this way, it is possible for interpreters to distinguish between direct and indirect translation, and indirect translations can easily be avoided as much as possible.

Prior art interpreting desk systems offer limited feedback capabilities for the interpreter. The interpreter desks currently on the market typically have an LCD screen with limited capabilities so that typically only textual feedback is possible, for example on the quality of the defined channels in the interpreter system. This does not always make it possible to see the situation in a conference room at a glance, which can lead to errors. In addition, there is typically no indication as to a number of statistics that may indeed be important for the proper functioning of an interpreter (e.g. the amount of time spoken by an interpreter, the number of listeners listening to the interpreter, whether a particular channel is recorded or an indication of who is active on a particular channel).

More specifically, the present invention relates to the delivery of feedback information to the interpreters, so they have a better view of the actual working conditions in which they find themselves. As explained above, these possibilities are after all not or only to a very limited extent present in the current state of the art.

There is thus a need for a conferencing system which makes it possible to supply more detailed feedback information to interpreters than that which interpreters receive today.

SUMMARY OF THE INVENTION

It is an object of embodiments of the present invention to provide a central unit which can provide to the interpreter desk, and thus to the interpreter, more detailed feedback about the context in which work is carried out, and thus to achieve better performance of the interpreter. It is also an aim to provide a conferencing system that comprises such a central unit. It is further an aim of embodiments of the present invention to propose a method for providing information on the use of an interpreter channel to an interpreter in a conferencing system.

The above objective is accomplished by the solution according to the present invention.

In a first aspect the invention relates to a central unit for a digital conferencing system. The central unit comprises a processing unit arranged for receiving a plurality of first control signals from a plurality of interpreter desks, said first control signals indicating which outgoing interpreter channel is selected on an interpreter desk, and on the basis thereof identifying which interpreter is interpreting in which interpreter channel and arranged for, based on said identification, returning to and displaying on the plurality of interpreter desks a plurality of feedback signals, said feedback signals allowing the interpreters to know whether and by whom the interpreter channel they are using, is taken over. The central unit is further arranged for receiving a plurality of second control signals from a plurality of listening units, the plurality of second control signals indicating which audio channel on a listening unit of the plurality of listening units is selected, for deriving, on the basis thereof, a total number of listeners per listening channel and for sending to and displaying on the plurality of interpreter desks, information on the total number of listeners per listening channel.

The proposed solution indeed allows for providing interpreters with a better view of the environment in which they are working. After all, within the central unit, control commands can be defined to indicate which channels are selected for interpreting or for listening and algorithms are implemented to translate this information into control commands for the graphic display of the interpreter desks to present this information graphically on the display.

The invention also relates to a conferencing system comprising a central unit as described above.

In a preferred embodiment the conferencing system comprises a plurality of interpreter desks. The conferencing system preferably also comprises a plurality of listening units.

In a preferred embodiment an interpreter desk of said plurality comprises a screen on which is indicated whether a recording is being made of the interpreter channel used, based on the second control signals.

In an embodiment at least one interpreter desk of said plurality comprises a processing unit equipped to, based on the first control signals, indicate by whom a sent out translation is taken over in another interpreter desk, or with which other translation said sent out translation is mixed in another interpreter desk.

In another embodiment, one of said audio-input channels is the floor channel of the conferencing system.

Preferably, the suggested one or more audio input channels are further based on information about which interpreters are active in an interpreter session.

In another aspect, the invention relates to a method for providing information on the use of an interpreter channel to an interpreter in a digital conferencing system, comprising:

receiving in a central unit of the digital conferencing system, a plurality of first control signals from a plurality of interpreter desks, said plurality of first control signals indicating which interpreter channel in an interpreter desk of the digital conferencing system has been selected, identifying, based on the first control signals, which interpreter is interpreting in which interpreter channel, sending back to the plurality of interpreter desks a plurality of feedback signals based on said identification and displaying the plurality of feedback signals on the plurality of interpreter desks.

The method further comprises:

receiving in the central unit a plurality of second control signals from a plurality of listening units, said plurality of second control signals indicating which listening channel on a listening unit of the plurality of listening units is selected, deriving, based on the second control signals, a total number of listeners per listening channel, sending back information on the total number of listeners per listening channel to the plurality of interpreter desks.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
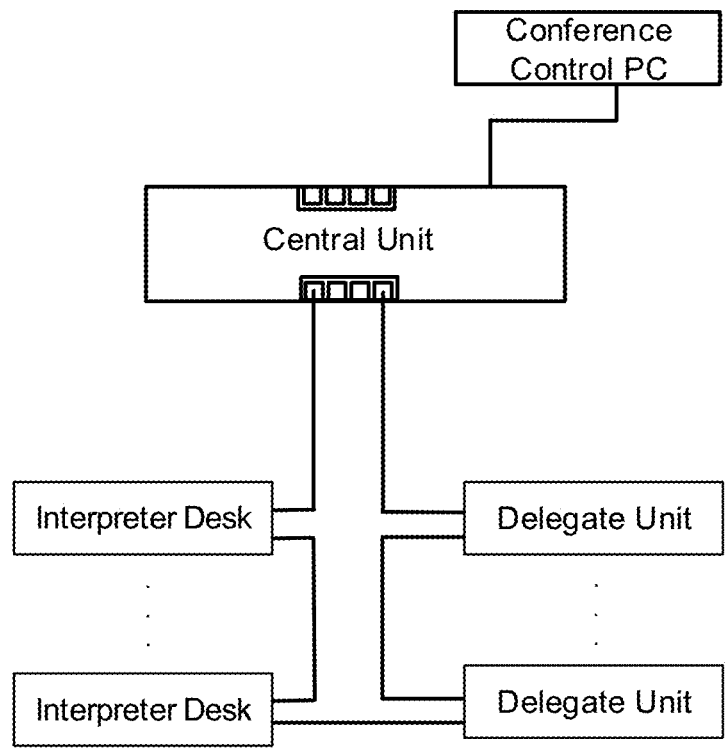
FIG. 1 gives an overview of a conference network.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention proposes a central unit for use in a digital conferencing system. The central unit allows interpreters to perform their work in a more comfortable manner during an audio/video conference because more and relevant feedback information is provided to the interpreters. FIG. 1 provides an overview of a conferencing system, with a central unit connected to a personal computer on which the conference management system is running. A plurality of interpreter desks and listening units are connected to the central unit. The listening units are typically part of a delegate unit of the conferencing system.

In the proposed solution a processing unit is provided in the central unit, comprising a software processor and a dedicated hardware processing unit, allowing different events from the conference network to be received and, on the basis thereof, the necessary control commands to be sent to an interpreter desk so that important, mission-critical data can be shown. In practice, this is often implemented in a microcontroller subsystem, an FPGA and/or a personal computer on which the conference management system is running.

This is implemented by, in addition to the data, audio and video traffic within a conference network, also implementing a control channel in the conference network. This control channel detects all events that occur in the conferencing system (e.g. the selection of an outgoing channel on the interpreter desk by an interpreter or the selection of an incoming channel by a listener) and transfers that information with the appropriate priority to the central unit, which in turn (using software algorithms) analyses and processes these commands by means of a set of control commands (feedback signals) to the interpreter desk, allowing the interpreter desk to display relevant data on the use of the conferencing system.

More specifically, in this case it is indicated which interpreter is speaking (relaying) on a channel that is already assigned to a specific interpreter desk and how many people, using a listening unit, are listening to the channel in which the interpreter is translating at that time (including any recording of this channel).

Figure 2:
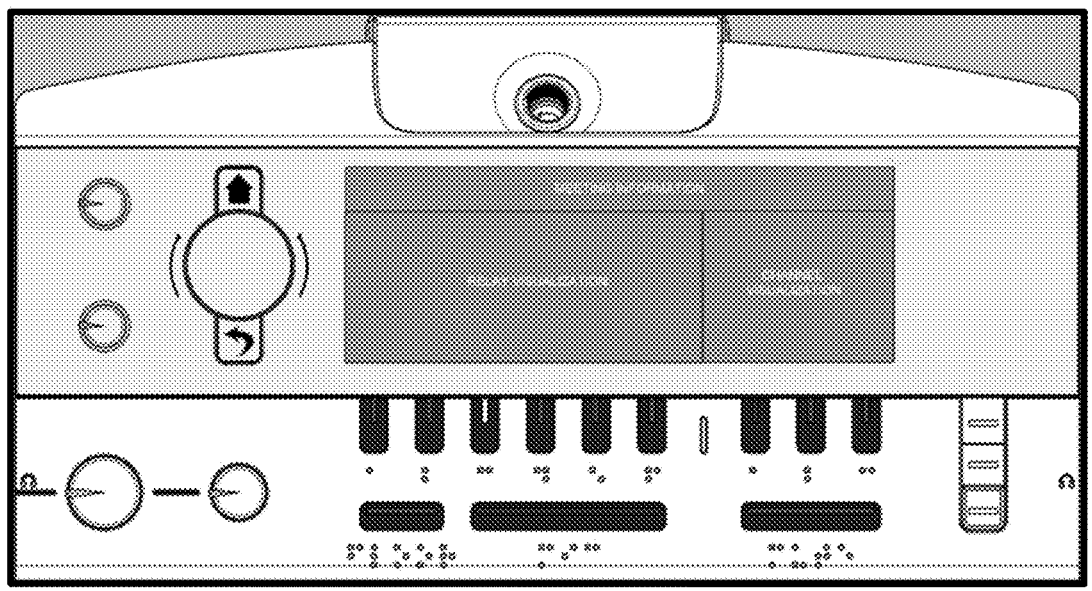
FIG. 2 illustrates an embodiment of the general interpreter desk interface.

A general overview of an interpreter desk interface is shown in FIG. 2. Different areas can be clearly recognised (display, buttons, etc.). As an additional improvement, this invention proposes an interpreter desk wherein on the display, not only a number of icons with relevant feedback information within a conference network can be shown, but also a clear image of the way in which the various successive languages have been translated, starting from the floor language and finally arriving at the relay language. This is also clearly illustrated in FIG. 3, in which the bars and the intermediate language not only show how the relay language has been formed, but also an immediate indication is given of the quality of the translation through symbols (e.g. −, +, 0, etc.). In this way, the interpreter himself or herself may choose the best predefined relay or best relay channel suggested by the interpreting equipment.

In addition to the above-mentioned aspects of the interpreter desk, a number of other improvements are also possible through the use of a graphic display. For example, the most appropriate relay channel can be displayed graphically.

Figure 3:
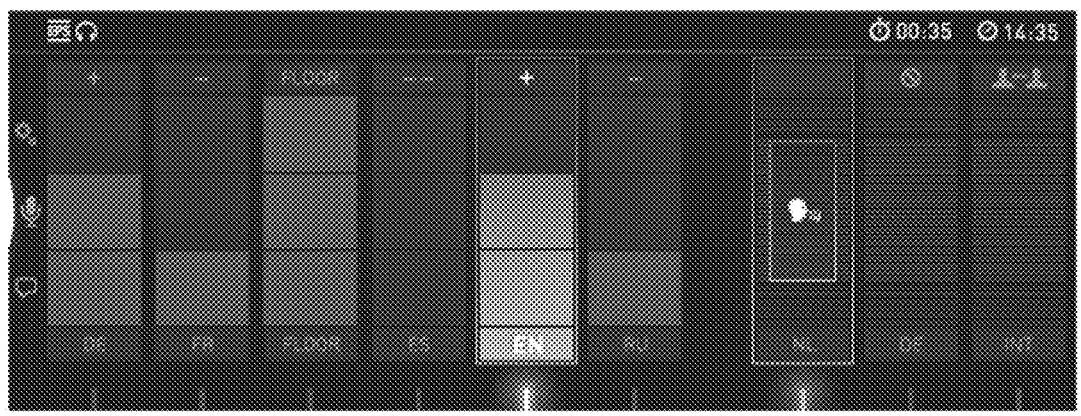
FIG. 3 illustrates the indication that an interpreter desk channel is occupied by an interpreter in the same interpreter's booth.
Figure 4:
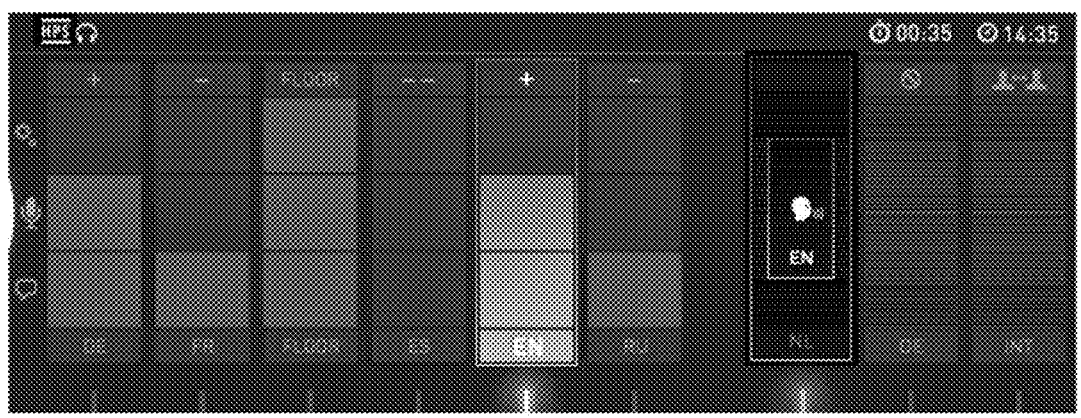
FIG. 4 illustrates the indication that an interpreter desk channel is occupied by an interpreter in another interpreter's booth.

FIG. 3 illustrates the 'channel busy' indicator, the typical 'talking heads' icon that appears in the NL channel. This way, an interpreter knows that his colleague in the same interpreter's booth has taken over the channel. A variant of this indicator is shown in FIG. 4, where the language of the other interpreter's booth has now also been added (EN in this case) under the same 'talking heads' icon.

Figure 5:
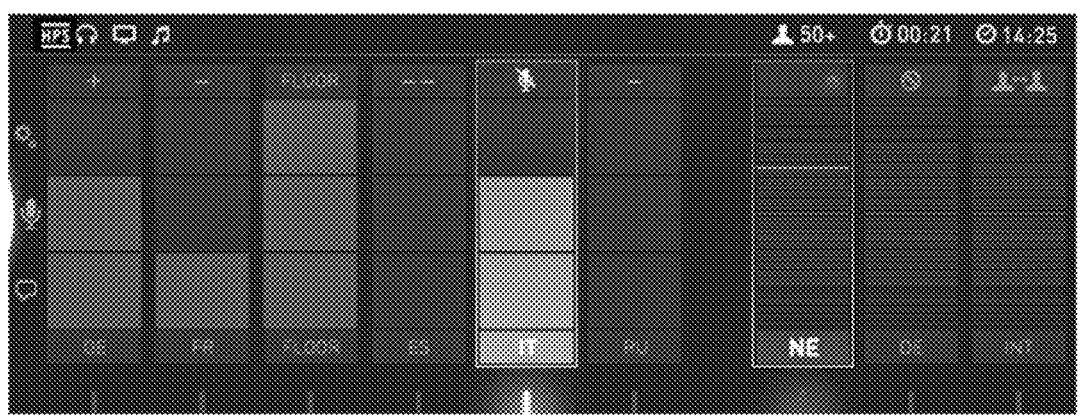
FIG. 5 illustrates the recording indicator and the indication of the number of listeners.

FIG. 5, in addition to showing the number of people listening (50+), also shows whether a particular outgoing channel is being recorded. These two indicators allow the interpreter to clearly assess whether it actually makes sense to actively interpret.

Additionally, interpreters can receive on their interpreter desk feedback from meeting operators through messaging and visual indication of volume and or audio quality of the interpreters speech.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A central unit for a digital conferencing system comprising a processing unit arranged for collecting, via a control channel arranged to detect events in the digital conference system, a plurality of first control signals from a plurality of interpreter desks, said plurality of first control signals indicating which interpreter channel is selected on an interpreter desk, and for identifying, based on said plurality of first control signals, which interpreter is interpreting in which interpreter channel and arranged for, based on said identification, returning to and displaying on said plurality of interpreter desks a plurality of feedback signals, said feedback signals allowing the interpreters to know whether and to whom the interpreter channel they are using is transferred, said central unit further arranged for collecting via said control channel a plurality of second control signals from a plurality of listening units, said plurality of second control signals indicating which audio channel from a plurality of audio channels is selected on a listening unit of said plurality of listening units, for deriving, based on said plurality of second control signals, a total number of listeners per listening channel and for sending to and displaying on said plurality of interpreter desks, information on said total number of listeners per audio channel being listened to.

2. A conferencing system comprising a central unit as in claim 1.

3. The conferencing system as in claim 2, comprising a plurality of interpreter desks.

4. The conferencing system as in claim 3, comprising a plurality of listening units.

5. The conferencing system as in claim 4, in which an interpreter desk of said plurality comprises a screen on which is indicated whether a recording is being made of the interpreter channel used, based on said second control signals.

6. The conferencing system as in claim 3, in which an interpreter desk of said plurality comprises a screen on which is indicated whether a recording is being made of the interpreter channel used, based on said second control signals.

7. The conferencing system as in claim 3, wherein at least one interpreter desk of said plurality comprises a processing unit equipped to, based on said first control signals, indicate to whom a sent out translation is to be transferred in another interpreter desk, or with which other translation said sent out translation is to be mixed in another interpreter desk.

8. The conferencing system as in claim 2, comprising a plurality of listening units.

9. The conferencing system as in claim 8, in which an interpreter desk of said plurality comprises a screen on which is indicated whether a recording is being made of the interpreter channel used, based on said second control signals.

10. A method for providing information on a use of an interpreter channel to an interpreter in a digital conferencing system, comprising the steps of:
  collecting in a central unit of said digital conferencing system via a control channel arranged to detect events in the digital conference system, a plurality of first control signals from a plurality of interpreter desks, said plurality of first control signals indicating which interpreter channel in an interpreter desk of said digital conferencing system has been selected;
  identifying, based on said first control signals, which interpreter is interpreting in which interpreter channel;
  sending back to said plurality of interpreter desks a plurality of feedback signals based on said identification and displaying said plurality of feedback signals on said plurality of interpreter desks;
the method further comprising:
  collecting in said central unit via said control channel, a plurality of second control signals from a plurality of listening units, said plurality of second control signals indicating which audio channel from a plurality of audio channels is selected on a listening unit of said plurality of listening units;
  deriving, based on said second control signals, a total number of listeners per audio channel being listened to;
  sending back information on said total number of listeners per listening channel to said plurality of interpreter desks.

* * * * *